Figure 1:
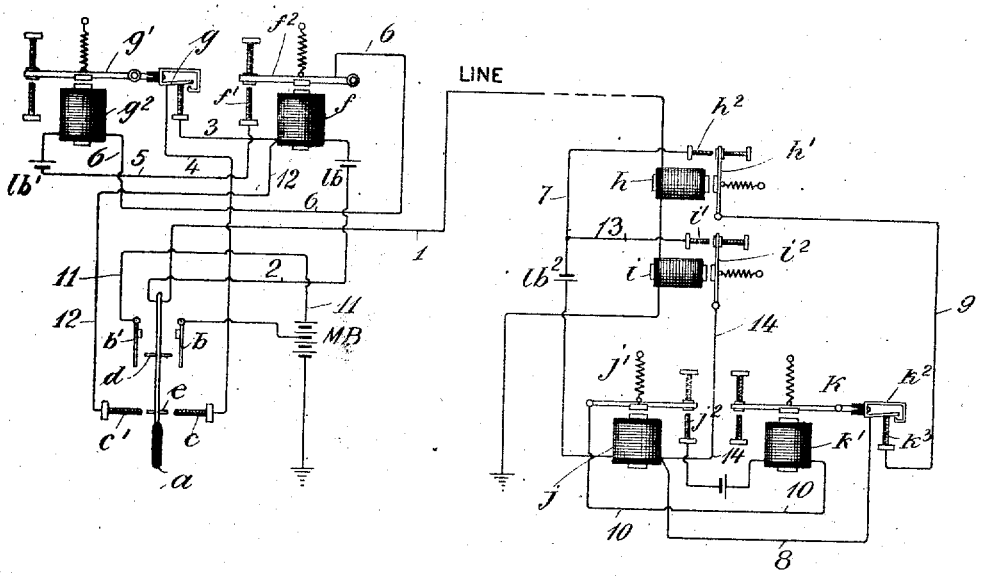

P. B. DELANY.

TELEGRAPHY.

APPLICATION FILED NOV. 20, 1908.

12,906. Reissued Jan. 5, 1909.

2 SHEETS—SHEET 1.

Witnesses:
Max P. A. Doring
L. F. Browning

Inventor
Patrick B. Delany
By his Attorney
Edward C. Davidson

P. B. DELANY.
TELEGRAPHY.
APPLICATION FILED NOV. 20, 1908.
12,906. Reissued Jan. 5, 1909.
2 SHEETS—SHEET 2.
*Fig: 2,*
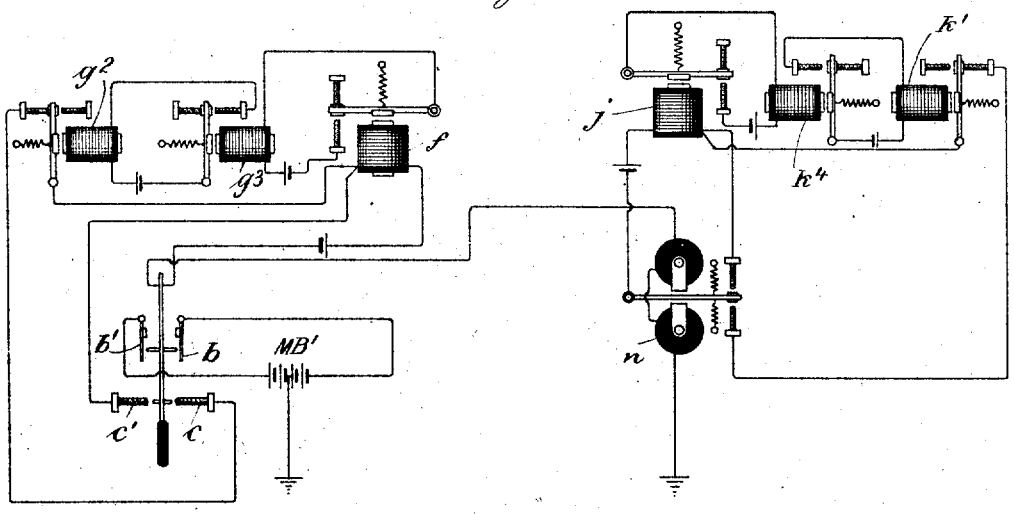
*Fig: 3.*
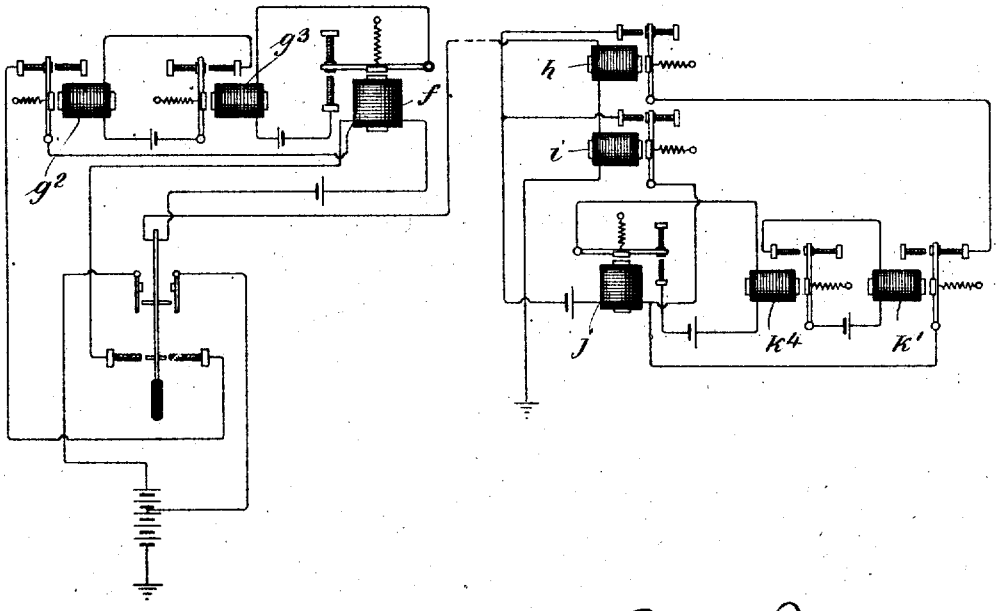
Witnesses:
Max B. A. Doring.
L. F. Browning
Patrick B. Delany Inventor
By his Attorney
Edward C. Sandeen

UNITED STATES PATENT OFFICE.

PATRICK B. DELANY, OF SOUTH ORANGE, NEW JERSEY, ASSIGNOR TO DELANY TELEGRAPHIC TRANSMITTER COMPANY, OF AUGUSTA, MAINE, A CORPORATION OF MAINE.

TELEGRAPHY.

No. 12,906. Specification of Reissued Letters Patent. Reissued Jan. 5, 1909.

Original No. 877,555, dated January 28, 1908, Serial No. 251,951. Application for reissue filed November 20, 1908. Serial No. 463,736.

*To all whom it may concern:*

Be it known that I, PATRICK B. DELANY, a citizen of the United States, residing at South Orange, county of Essex, State of New Jersey, have invented certain new and useful Improvements in Telegraphy, of which the following is a specification.

The objects of this invention are to increase speed of transmission; relieve the operator from fatigue and nervous strain in case of key transmission; produce uniform signals, in case of key transmission, the personal peculiarities of transmission of an operator that appear in received signals when he operates an ordinary telegraph key being almost entirely eliminated, and to afford secrecy of messages traversing the circuit, the impulses being such as to be un ntelligible to a wire-tapper however skilled a telegraph operator he may be. The methods of operation by which these results are attained are applicable to telegraphic or signaling circuits of various kinds and hence it is not intended by the language of this specification to restrict the invention to a circuit of a special kind, nor to the apparatus shown in the drawing, which is designed to be illustrative merely of various means that may be employed.

Figure 2:
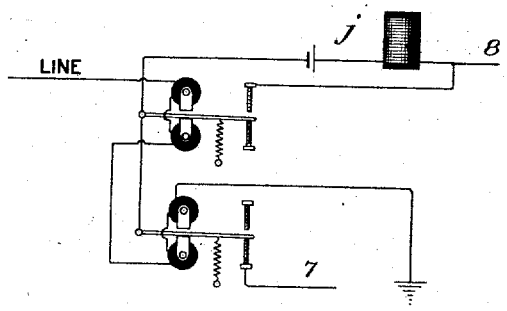

In the drawings, Figures 1 to 3 inclusive are diagrams illustrating ways of practicing the methods comprised in this invention.

In Fig. 1, $a$ is a manual key shown as a spring blade movable in either direction from a normal central inactive position. On one side of it is a pair of contacts $b$ $c$ and on the other side corresponding oppositely arranged contacts $b'$, $c'$.

The opposite contacts $b$, $b'$ are shown as spring blades normally bearing upon limiting posts. Between them and normally out of contact with both of them is a cross piece $d$ electrically one with the key.

The opposite contacts $c$, $c'$ are shown as adjustable screws between which a cross piece $e$, also carried by the key blade and electrically one with it, is normally out of contact with both stops.

MB is the main battery one pole of which is grounded. A connection extends from the middle of the battery to contact $b$ and from the other pole of the battery to contact $b'$. When the key is moved to the right to make electrical contact with $b$ and $c$, the middle of the battery is connected through the key and thence by wire 1 to line and an impulse of current representing a portion only of the battery will be transmitted to the receiving station. A local circuit is also completed from the key by wire 2 through a local battery $l\,b$, coil of relay $f$ and thence by wire 3 to a contact post coöperating with a yielding contact $g$ carried by and insulated from the armature lever $g'$ of a second relay $g^2$. The local circuit being traced is completed from the yielding contact $g$ by wire 4 to contact $c$ of the key. The front stop $f'$ of the relay $f$ is connected by wire 5 through local battery $l\,b'$ and coil of relay $g^2$ and thence by wire 6 to armature lever of relay $f$.

The circuit of the magnet $f$ having been closed as described, its armature lever $f^2$ is attracted to its front stop $f'$ thereby closing the local circuit of relay $g^2$ which, attracting its armature, carries the yielding contact $g$ away from its coöperating contact post and opens the local circuit of relay $f$. This operation will be repeated as long as the operator holds his key to the right against the contacts $b$, $c$, and each break in the local circuit of the relay $f$ is manifest or audible to him and may represent dots of the Morse alphabet. The number of dots so produced will depend upon the time the key is held in contact with $b$ and $c$ and experience has shown that an operator soon becomes so skilled that he may thus, at will, form one or any desired number of dot signals. Assuming that the operator desires to transmit three dots, he would move his key to the right and hold it there during the period of time required for the three dots to be locally manifested to him. At the same time one half of the main battery MB would be permanently closed to line. The strength of current is such as to operate the receiving relay $h$ but is insufficient to operate the receiving relay $i$. Receiving relay $h$ being energized by such impulse continuing for a period of time sufficient for the formation of say three dots, closes its armature lever $h'$ against its front contact post $h^2$ completing a circuit from the heel of the armature lever through contact $h^2$, wire 7, local battery $l\,b^2$, coil of relay $j$ and thence by wire 8 to the contact finger $k^2$ of a second relay $k'$. The contact finger $k^2$ normally bears upon an adjustable contact post $k^3$ connected by wire 9 with the heel or pivot of the armature lever $h'$. The armature lever $j'$ of relay $j$ is connected by wire 10 through the winding of relay $k'$ and a local battery to the front stop $j^2$ of the relay $j$. Consequently, when the relay $j$ is energized to attract its armature on the closing of its local circuit at contact $h^2$, relay $k'$ is also energized and, attracting its armature, opens the local circuit of $j$ at the contacts $k^2$, $k^3$, when the armature levers of both relays $j$, $k'$, return to normal position making an audible sound representing a dot. This operation is repeated as long as the armature lever of relay $h$ is closed against stop $h^2$. The adjustment of the apparatus is such that during the period that the main line relay $h$ is energized, which corresponds with the period during which, at the sending station, the line is closed to the battery and three dot signals are there loosely produced, three dot signals will be correspondingly produced, as described, at the receiving station. A local manifestation of the dots at the transmitter is for the guidance of the transmitting operator. In this way, a single continuous signal impulse may be transmitted and be locally, at the receiver, automatically disintegrated into the number of dot signals which it represents, such dot signals being audibly manifested as usual to the receiving operator. Obviously, the received dot signals are uniform and the sending operator, being relieved of the labor of producing each dot by separate manipulation of his key, may transmit more rapidly and without the nervous strain and fatigue incident to manipulation of an ordinary telegraph key. He may, therefore, transmit at a higher speed and the dot signals transmitted will be uniform irrespective of any peculiarity or the personal equation of the individual operator. The speed of transmission is dependent upon the capacity of the receiving operator to read by ear the received signals; or, by the use of ordinary recording devices, the received signals may be recorded at such speed as the transmitting operator is capable of attaining. The lever $k$ of relay $k'$ may be limited in its movement to practically a noiseless degree so that $j$ alone sounds the signals.

When the key $a$ is moved to the left, the entire transmitting battery MB is connected by wire 11, spring contact $b'$, key and wire 1 to line. At the same time, the local circuit of relay $f$ is closed from the key, through wire 2, local battery $l\ b$ and by wire 12 to contact $c'$ of the key, so that as long as the key is held to the left, the armature levers of relays $f$ and $g^2$ remain attracted. The generator impulse so sent to line may represent a dash and is of such strength as to cause it to energize the main line receiving relays $h$, $i$. The front stop $i'$ of the dash receiving relay $i$ is connected by wire 13 through local battery $l\ b^2$; thence through the winding of relay $j$; and thence by wire 14 to armature lever $i^3$ of main line relay $i$. So long therefore as this armature lever is closed against its front stop, the armature levers of the relays $j$ and $k'$ are permanently attracted and are released when the continuous impulse representing a dash ceases and thereby the receiving operator is audibly apprised of the received dash signal.

It would be difficult, if not impracticable, to tap a circuit of this character since the signals to be received upon an ordinary telegraphic receiving outfit would be for the most part merely a succession of dashes of varying length.

In Fig. 2 the general operation is the same except that impulses of one polarity are used to transmit dashes and opposite polarity for dots. The generator, or main battery MB′, is grounded at the middle and its opposite poles connected to key contacts $b$, $b'$. When the key is closed to the right one pole of the battery is put to line; the local circuit of relay $f$ is closed and automatically opened at contacts of relay $g^2$ to produce dot signals. To provide for longer or heavier dots, a third local relay $g^3$ is interposed between relays $f$ and $g^2$ to slow the action of sounder $f$. The line impulse so transmitted moves the centrally biased armature lever of the receiving main line polarized relay $m$ to its lower stop, as viewed in Fig. 2, thereby completing the circuit of local relay $j$ which includes the separable but normally closed contacts of local relay $k'$ between which relay and $j$ a third relay $k^4$ is interposed. As before, the continuous main circuit impulse is converted automatically into the corresponding number of dot signals. When the transmitting key is thrown to the left the opposite pole of main battery is put to line and the local circuit of relay $f$ remains closed. The armature lever of main line polarized relay $m$ is thrown to its upper stop, closing the local circuit of relay $j$, as long as such contact is maintained, the signal manifested or recorded at the receiving station being a dash.

Fig. 2ª shows a modification in which the polarized line relay $m$ is replaced by two biased polarized relays. The operation is obviously the same.

Fig. 3 shows the arrangement of divided main battery and neutral receiving relays with the interposition of a third local relay $g^3$ at the transmitter and $k^4$ at the receiver to retard the rapidity with which the solid impulses are converted automatically into a corresponding series of dot signals.

The speed of automatic action of the receiving apparatus is easily regulated by adjustment of movement of levers of the local relays, or by changing the tension of their retractile springs. Such increase of play of the levers, or of tension of the springs, will cause slower automaticity. The middle relay of itself affords ample bounds of speed regulation to bring the receiving set in corresponding movement with the transmitting telltale set.

I claim as my invention:

1. In telegraphy, a method of transmission consisting in locally producing at a transmitting station code dots and dashes, simultaneously transmitting to a receiving station signals of a different kind, and locally converting at the receiver said transmitted signals into dot and dash signals corresponding with those locally produced at the transmitting station.

2. In telegraphy, a method of transmission consisting in locally producing at a transmitting station short code dot signals, simultaneously transmitting to a receiving station a long signal whose length is determined by the number of said dots and locally converting at the receiver said long signal into the same number of dots locally produced at the transmitting station.

3. In telegraphy, a method of transmission, consisting in transmitting a signal of one kind, locally at the transmitter simultaneously producing a group of signals of another kind, and at the receiver locally converting the transmitted signal into a group of signals corresponding with those produced at the transmitter.

In testimony whereof I have hereunto subscribed my name.

PATRICK B. DELANY.

Witnesses:
CHAS. E. PERKINS,
C. A. AUER.